2,861,895

PAVING COMPOSITION OF LOW THERMAL CONDUCTIVITY

Harley F. Hardman, Lyndhurst, Ohio, assignor to The Standard Oil Company, Cleveland, Ohio, a corporation of Ohio No Drawing. Application December 30, 1955
Serial No. 556,391

2 Claims. (Cl. 106—281)

This invention relates to a paving composition of low thermal conductivity. More particularly, the invention relates to a composition comprising asphalt; aggregate; and small, hollow, hole-free particles.

In asphaltic paving material there are many usages where low thermal conductivity is desirable because this lessens the extremes of pavement temperature due to cyclic variations in the air temperature and thus slows temperature change in the interior of the pavement or the transfer of heat from one surface to the other. For this reason, asphalts of low thermal conductivity have greater stability, and low-temperature cracking problems are less severe. The composition of my invention is especially useful in instances where low thermal conductivity of the asphaltic pavement is desirable; for instance, on bridge floors where the cooling from below by cold air normally prevents snow and ice being melted by the sun shining on the surface. With an asphaltic pavement of low thermal conductivity, according to my invention, it is possible to achieve enhanced melting of the snow and ice on bridge floors.

The asphalt ingredient of my invention may be asphalt cement, cutback asphalt or asphalt emulsions. The latter two forms, upon the evaporation of the solvent and water respectively, leave an asphaltic residue which is similar to asphalt cement. None of the critical properties, such as adherence to aggregate, emulsion stability, or other similar factors, are involved in this invention, which factors normally distinguish these three forms of asphalt. The asphalt cement may have any of the usual properties suiting it for paving purposes which can be ascertained from the highway specification manuals or from Abraham's text—"Asphalt and Allied Substances." In general, asphalt cement for paving purposes is required to meet penetration specifications, and the preferred penetration will be 50 to 200 at 77° F. Cutback asphalt may be any of the standard grades used in paving and is not critical. Asphalt emulsions may be the medium, rapid or slow curing types. The form of the asphalt is not critical, and those skilled in the art are well aware of the requirements.

The aggregate which is mixed with the asphalt may be any of the common aggregates such as crushed limestone, crushed rock, sand, gravel, etc. and may vary in size from 2 inches to less than 200 mesh. Gradation from the particle-size, from the larger to the smaller, conforms to normal usage of aggregate.

The third ingredient of my invention consists of small, hollow, hole-free particles of a film-forming substance which are available commercially as Microballoon[1] spheres. These Microballoon spheres and their method of manufacture are fully described in French Patents 1,077,786 and 1,077,787, the disclosure of which to the extent necessary is incorporated herein by reference. These Microballoon spheres may be made from any film-forming material such as synthetic resins, including phenol-formaldehyde or urea-formaldehyde, other film-forming materials such as polyvinyl alcohol; natural proteins such as casein, polystyrene; various cellulosic derivatives; polyethylene, polyamides (nylon); inorganic film-forming material such as sodium silicate, sodium aluminate; and various ceramic film-forming materials. The particles have a size range of from one micron to ⅛ of an inch in diameter, and an average diameter of from one micron to 500 microns, a bulk density of 0.01 to 0.3 g./cc., and a liquid displacement density of 0.05 to 0.6 g./cc., preferably 0.2 to 0.5 g./cc. Each of the particles is a distinct and completely separate entity having a hollow, gas-filled interior and an exterior of film-forming material free from holes. They are made by the process described in the French patents.

The composition of my invention comprises from 2 to 25% asphalt, preferably 8 to 15%, 0.1 to 5% Microballoon spheres, preferably 1 to 3%, and the balance aggregate. All percentages are by weight. An important aspect of my invention is the discovery that a very small proportion of the Microballoon spheres will give a large improvement in the resistance of the asphalt to heat conduction.

The following example illustrates the best mode contemplated for carrying out my invention:

Example 1

A mixture was prepared of 12.2% asphalt cement having a penetration of 70/80 at 77° F.; 2% Microballoon spheres formed of phenol formaldehyde resin having a size range of 10 to 70 microns and an average diameter of 24 microns, a bulk density of 0.08 g./cc., and a liquid displacement density of 0.253 g./cc.; and 86% of 40 to 80 mesh sand. The mixture was prepared by heating the asphalt to a temperature of 320° F. and mixing the Microballoon spheres and the sand with the molten asphalt. The mixture was compressed into a cylindrical cavity 2 inches in diameter and 2 inches high. The compressed mixture was permitted to cool and was self-retaining in shape.

The molded cylinder was then placed on a block of Dry Ice with the vertical axis perpendicular to the Dry Ice so that the bottom of the cylinder rested on the Dry Ice surface. The top of the cylinder was covered with as much water as could be retained on the surface. The water froze in 40 minutes as a result of the cold which was conducted from the Dry Ice upwardly through the two inches of the composition.

Example A

In contrast with this, a standard paving composition containing 10% of the same asphalt, 15% limestone dust having an average particle-size of less than 200 mesh, and 75% 40 to 80 mesh sand was prepared by the identical process and was tested under the identical conditions. With such a cylinder the water froze in only 13 minutes. I believe it is surprising that the inclusion of such a small amount of the Microballoon spheres gives over a threefold decrease in the conductivity of the asphalt composition.

While the compositions are not identical in proportions, they are comparable. In Example I, the asphalt is 12% and the aggregate 88%, and in Example A, the asphalt is 10% and the aggregate is 90%. The amount of asphalt in Example I is slightly larger than in Example A because the Microballoon spheres are very small and have a very large surface area relative to their weight. Accordingly, it was necessary to have a slightly larger amount of asphalt in order that the ratio of the asphalt to the surface area of the aggregate (counting the Microballoon spheres as a part of the aggregate) would be proper. The amount of limestone dust in Example A is

[1] Trademark Registration No. 592,907.

treated as a part of the aggregate and is relatively high because the limestone particles are solid and have a much higher density than the Microballoon spheres. Accordingly, it is necessary to use a much larger weight in order that the surface area of the limestone dust particles should be comparable to the surface area of the Microballoon spheres.

I claim:

1. A composition comprising 2 to 25% asphalt, 70 to 97.9% aggregate of 2-inch to less than 200 mesh, the gradation conforming to normal paving usage; 0.1 to 5% spherical particles having a bulk density of 0.01 to 0.3 g./cc., a liquid displacement density of 0.05 to 0.6 g./cc., and a size range of 1 micron to 1/8" in diameter and an average diameter of 1 to 500 microns, each of said particles being a distinct, complete and separate entity having a hollow, gas-filled interior and an exterior of film-forming material free from holes.

2. A composition comprising 8 to 15% asphalt cement, 82 to 91% aggregate of 2-inch to less than 200 mesh, the gradation conforming to normal paving usage; 1 to 3% spherical particles having a bulk density of 0.01 to 0.3 g./cc., a liquid displacement density of 0.05 to 0.6 g./cc., and a size range of 1 micron to 1/8" in diameter and an average diameter of 1 to 500 microns, each of said particles being a distinct, complete and separate entity having a hollow, gas-filled interior and an exterior of film-forming material free from holes.

References Cited in the file of this patent

UNITED STATES PATENTS

| | | |
|---|---|---|
| 2,275,164 | Thomas et al. | Mar. 3, 1942 |
| 2,449,253 | Sargent | Sept. 14, 1948 |
| 2,565,107 | Watts | Aug. 21, 1951 |
| 2,626,872 | Miscall | Jan. 27, 1953 |
| 2,634,208 | Miscall et al. | Apr. 7, 1953 |
| 2,758,937 | Ford | Aug. 14, 1956 |
| 2,786,772 | Stewart et al. | Mar. 26, 1957 |